(12) United States Patent  (10) Patent No.: US 8,508,188 B2
Murtha et al.  (45) Date of Patent: Aug. 13, 2013

(54) UNIVERSAL CHARGE MODULE

(75) Inventors: Joseph G. Murtha, Monroe, CT (US); Mark Ross, Fairfield, CT (US); James Markland, Stratford, CT (US); William Frederick, Bridgeport, CT (US); Carl Hultman, Derby, CT (US)

(73) Assignee: Anton/Bauer, Inc., Shelton, CT (US)

( * ) Notice: Subject to any disclaimer, the term of this patent is extended or adjusted under 35 U.S.C. 154(b) by 260 days.

(21) Appl. No.: 12/761,078

(22) Filed: Apr. 15, 2010

(65) Prior Publication Data

US 2010/0264874 A1  Oct. 21, 2010

Related U.S. Application Data

(60) Provisional application No. 61/170,178, filed on Apr. 17, 2009.

(51) Int. Cl.
*H02J 7/00* (2006.01)
*H02J 7/04* (2006.01)

(52) U.S. Cl.
USPC .......................... 320/110; 320/128; 320/162

(58) Field of Classification Search
USPC ........................................ 320/110, 128, 162
See application file for complete search history.

(56) References Cited

U.S. PATENT DOCUMENTS

| | | | |
|---|---|---|---|
| 4,006,396 A * | 2/1977 | Bogut | 320/125 |
| 4,218,107 A * | 8/1980 | Wilson | 439/342 |
| 4,822,296 A | 4/1989 | Wilson | |
| 5,594,318 A * | 1/1997 | Nor et al. | 320/108 |
| 5,847,537 A * | 12/1998 | Parmley, Sr. | 320/109 |
| 6,160,376 A | 12/2000 | Kumar et al. | |
| 6,247,962 B1 * | 6/2001 | DeSorbo | 439/500 |
| 6,522,102 B1 | 2/2003 | Cheiky et al. | |
| 6,580,948 B2 * | 6/2003 | Haupert et al. | 607/60 |
| 2003/0076072 A1 | 4/2003 | Tojo | |
| 2005/0275372 A1 | 12/2005 | Crowell | |
| 2006/0085658 A1 * | 4/2006 | Allen et al. | 713/310 |
| 2007/0188134 A1 | 8/2007 | Hussain et al. | |
| 2008/0007212 A1 * | 1/2008 | Theytaz et al. | 320/107 |
| 2008/0231233 A1 | 9/2008 | Thornton | |
| 2008/0238356 A1 * | 10/2008 | Batson et al. | 320/103 |
| 2009/0003637 A1 * | 1/2009 | Pansell et al. | 381/314 |
| 2010/0001689 A1 | 1/2010 | Hultman et al. | |

FOREIGN PATENT DOCUMENTS

| | | |
|---|---|---|
| JP | S6410586 A | 1/1989 |
| JP | 2000324706 A | 11/2000 |
| JP | 2001275270 A | 10/2001 |
| JP | 2006211858 A | 8/2006 |
| WO | 9601518 A1 | 1/1996 |

* cited by examiner

*Primary Examiner* — M'baye Diao
(74) *Attorney, Agent, or Firm* — McCormick, Paulding & Huber LLP

(57) ABSTRACT

A universal charge module for recharging rechargeable batteries includes a housing, a connector block formed on the housing for receiving a rechargeable battery, the connector block including an attachment mechanism for releasably attaching the rechargeable battery to the housing, and a power control circuit functionally integrated with the housing, the power control circuit being capable of determining operating and charging parameters of the rechargeable battery, wherein the power control circuit controls the recharging of the rechargeable battery in dependence upon the determined operating and charging parameters.

9 Claims, 25 Drawing Sheets

| Power Supply Size (Watts) | Total Available Charge Current (Amps) | Maximum Charge Current per Channel (Amps) | Hytron140 Charge Time (Hrs) | Dionic90 Charge Time (Hrs) |
|---|---|---|---|---|
| 450 | 24 | 5.0 | 2.5 | 3.0 |
| 300 | 16 | 5.0 | 2.5 | 3.0 |
| 150 | 8 | 5.0 | 2.5 | 3.0 |
| 75 | 4 | 4.0 | 3.0 | 3.0 |

*FIG. 14*

| Power Supply Size (Watts) | Total Available Charge Current (Amps) | Maximum Charge Current per Channel (Amps) | Hytron140 Charge Time (Hrs) | Dionic90 Charge Time (Hrs) |
|---|---|---|---|---|
| 450 | 24 | 5.0 | 2.5 | 3.0 |
| 300 | 16 | 5.0 | 2.5 | 3.0 |
| 150 | 8 | 4.0 | 3.0 | 3.0 |
| 75 | 4 | 2.0 | 6.0 | 3.25 |

*FIG. 15*

| Power Supply Size (Watts) | Total Available Charge Current (Amps) | Maximum Charge Current per Channel (Amps) | Hytron140 Charge Time (Hrs) | Dionic90 Charge Time (Hrs) |
|---|---|---|---|---|
| 450 | 24 | 5.0 | 2.5 | 3.0 |
| 300 | 16 | 5.0 | 2.5 | 3.0 |
| 150 | 8 | 2.67 | 4.5 | 3.25 |
| 75 | 4 | 1.33 | 9.0 | 5.0 |

*FIG. 16*

| Power Supply Size (Watts) | Total Available Charge Current (Amps) | Maximum Charge Current per Channel (Amps) | Hytron140 Charge Time (Hrs) | Dionic90 Charge Time (Hrs) |
|---|---|---|---|---|
| 450 | 24 | 5.0 | 2.5 | 3.0 |
| 300 | 16 | 4.0 | 3.0 | 3.0 |
| 150 | 8 | 2.0 | 6.0 | 3.25 |
| 75 | 4 | 1.0 | 12.0 | 6.0 |

*FIG. 17*

Remote Charger Control Protocol

| Command | Value (HEX) | Number of Bytes | Description |
|---|---|---|---|
| Start_Standard_Test | 0x0A | 2 | Start a standard discharge test -2$^{nd}$ byte contains charge position number (1-8) |
| Start_24Hr_Test | 0x0B | 2 | Start a 24hr self-discharge test -2$^{nd}$ byte contains charge position number (1-8) |
| Dump_Test_Data | 0x0C | 2 | Dump an ASCII-Comma delimited EXCEL compatible file of the discharge data -2$^{nd}$ byte contains charge position number (1-8) |
| Start_Discharger | 0x0D | 2 | Start the discharger -2$^{nd}$ byte contains charge position number (1-8) |
| Stop_Discharger | 0x0E | 2 | Stop the discharger -2$^{nd}$ byte contains charge position number (1-8) |
| Start_Standard_Charge | 0x0F | 2 | Start a standard charge regime for the given battery type -2$^{nd}$ byte contains charge position number (1-8) |
| Provide_Fast_Charge | 0x10 | 3 | Provide fast charge current to a battery -2$^{nd}$ byte contains charge position number (1-8) - 3rd byte contains fast charge rate (0-5Amps in 100mA steps) |
| Provide_Bump_Up_Charge | 0x11 | 3 | Provide a bump-up charge for a battery -2$^{nd}$ byte contains charge position number (1-8) - 3rd byte contains bump-up charge rate (0-5Amps in 100mA steps) |

FIG. 18

Remote Charger Control Protocol

| | | | |
|---|---|---|---|
| Provide_Balance_Charge | 0x12 | 3 | Provide a balance charge for a battery - 2$^{nd}$ byte contains charge position number (1-8) - 3$^{rd}$ byte contains balance charge rate (0 -5Amps in 100mA steps) |
| Provide_Lifesaver_Charge | 0x13 | 3 | Provide a Lifesaver charge for a battery -2$^{nd}$ byte contains charge position number (1-8) - 3$^{rd}$ byte contains lifesaver charge rate (0 -5Amps in 100mA steps) |
| Start_Charge | 0x14 | 3 | Turn on charge current -2$^{nd}$ byte contains charge position number (1 -8) - 3$^{rd}$ byte contains charge rate (0 - 5Amps in 100mA steps) |
| Stop_Charge | 0x15 | 2 | Turn off charge current -2$^{nd}$ byte contains charge position number (1 -8) |
| Dump_Battery_Data | 0x16 | 2 | Dump all 2 6 bytes of battery related data (see below for format of data -2$^{nd}$ byte contains charge position number (1-8) |
| Authorized_To_Indicate_Full_Capacity | 0x17 | 2 | If the Smart Battery has deemed that it is full, indicate such after being authorized to do so -2nd byte contains charge position number (1- 8) |
| Forced_To_Indicate_Full_Capacity | 0x18 | 2 | The Smart Battery is forced to indicate that it is full -2nd byte contains charge position number (1 -8) |

FIG. 19

Remote Charger Control Protocol

| | | | |
|---|---|---|---|
| Get_Battery_Volts | 0x19 | 2 | Obtain battery voltage in 100mV steps - $2^{nd}$ byte contains charge position number (1-8) |
| Get_High_Resolution_Battery_Volts | 0x1A | 2 | Obtain battery voltage in 69.5mV steps - $2^{nd}$ byte contains charge position number (1-8) |
| Get_Battery_Temperature | 0x1B | 2 | Obtain battery temperature in 1 °C steps - $2^{nd}$ byte contains charge position number (1-8) |
| Get_Present_Capacity | 0x1C | 2 | Obtain present battery capacity in 100mAhr steps - $2^{nd}$ byte contains charge position number (1-8) |
| Get_Charge_State | 0x1D | 2 | Obtain the present charge state of the battery (see table below for a list of charge states) - $2^{nd}$ byte contains charge position number (1-8) |
| Get_TCO_Status | 0x1E | 2 | Obtain the status of the TCO pin (open or closed) - $2^{nd}$ byte contains charge position number (1-8) |
| Get_Charger_Information | 0x1F | 2 | Obtain the number of charge module stations attached (1st byte, 1 thru 8) and the size of the power supply ($2^{nd}$ byte in 5 Watt steps) |

FIG. 20

UNIVERSAL CHARGE MODULE

CROSS REFERENCE TO RELATED APPLICATIONS

This application claims the benefit of U.S. Provisional Application Ser. No. 61/170,178, filed on Apr. 17, 2009, which is herein incorporated by reference in its entirety.

FIELD OF THE INVENTION

The present invention relates generally to battery chargers and, more particularly, to an apparatus for charging rechargeable batteries of various chemistries.

BACKGROUND OF THE INVENTION

The key factors in selecting a professional video battery are size, weight, camera balance, runtime, service life, safety, reliability, compatibility, initial cost and cost to operate. No single battery size, type or chemistry can offer the ultimate in all of these characteristics in every shooting situation for every type of video operation. Accordingly, numerous battery types having different chemistries, such as nickel metal hydride, lithium ion and nickel-cadmium, each having different characteristics, are often used depending on the particulars of the video operation. In addition, there are countless battery manufactures producing batteries of all different types, sizes and chemistries. Even batteries of the same chemistry, if produced by different manufacturers, will differ in numerous respects such as size, internal components, circuitry and the like.

Moreover, inherent in any video operation is the need to charge each battery after use. Various charging systems for rechargeable batteries of different chemistries, such as nickel metal hydride, lithium ion and nickel-cadmium, are well known in the art. Known chargers, however, are only capable of charging batteries with certain chemistries because each battery type has a different charge profile that includes a particular charge time, charge rate and charge cut-off. As will be readily appreciated, an inappropriately charged battery may lead to overcharging or overheating, which may result in safety issues, or may lead to decreased battery life.

As such, in order to charge a nickel metal hydride battery, a lithium ion battery and a nickel-cadmium battery, for example, three separate chargers, each being configured specifically for the charge profile of each battery type, are required. As will be readily appreciated, even batteries of like chemistry, produced by different manufacturers, are often incapable of being charged on the same charger due to the precise battery makeup, internal components and other proprietary features of the respective batteries. For example, it is often the case that a charger designed to accommodate and charge a battery from one manufacturer cannot charge a battery from another manufacturer, even if both batteries have the same chemistry. Any attempt to interchange chargers and batteries across manufacturers may result in safety issues such as overheating or combustion, damage to the battery and/or charger inoperability.

In view of the problems associated with known battery chargers, there is a need for a universal charge module that is capable of charging one or more batteries having different chemistries. Such a universal charge module would obviate the need to carry around numerous battery chargers for each type of battery used in any given video operation.

SUMMARY OF THE INVENTION

In view of the foregoing, it is an object of the present invention to provide a universal charge module.

It is another object of the present invention to provide a universal charge module capable of charging rechargeable batteries having various cell chemistries.

It is another object of the present invention to provide a universal charge module that will fit within the footprint of a standard Anton/Bauer snap-on bracket assembly.

It is another object of the present invention to provide a universal charge module that can function as a stand-alone unit or can be combined with additional charge modules to form an up to 8-position charger.

It is another object of the present invention to provide a universal charge module that can be incorporated on the back of a video camera.

It is another object of the present invention to provide a universal charge module that can interface with any known power supply.

It is another object of the present invention to provide a universal charge module that can interface with a computer so that the charge module may be programmed and updated remotely to provide charge capability for any present or future battery type or design.

It is another object of the present invention to provide a universal charge module interfaced with a smart LCD board so that battery information may be displayed.

It is another object of the present invention to provide a universal charge module interfaced with a smart LCD board that has a communications interface for communicating with multiple charge modules.

It is yet another object of the present invention to provide a universal charge module that may be combined with other charge modules and a smart LCD board so that custom battery charging systems may be easily built by end users in dependence upon the number of charge positions and features desired.

It is therefore a general object of the present invention to provide a universal charge module that is capable of charging one or more batteries having different chemistries.

BRIEF DESCRIPTION OF THE DRAWINGS

The present invention will be better understood from reading the following description of non-limiting embodiments, with reference to the attached drawings, wherein below:

FIGS. 14-17 are matrices showing various off-the-shelf power supply sizes coupled with various charge module configurations and the resultant available charge current and charge times per station in accordance with various embodiments of the present invention.

FIGS. 18-20 are graphical displays showing an exemplary remote charger control protocol in accordance with one embodiment of the present invention.

DETAILED DESCRIPTION OF THE PREFERRED EMBODIMENTS

The present invention is directed to a universal charge module and charging system that is capable of charging one or more batteries having different chemistries.

Figure 1:
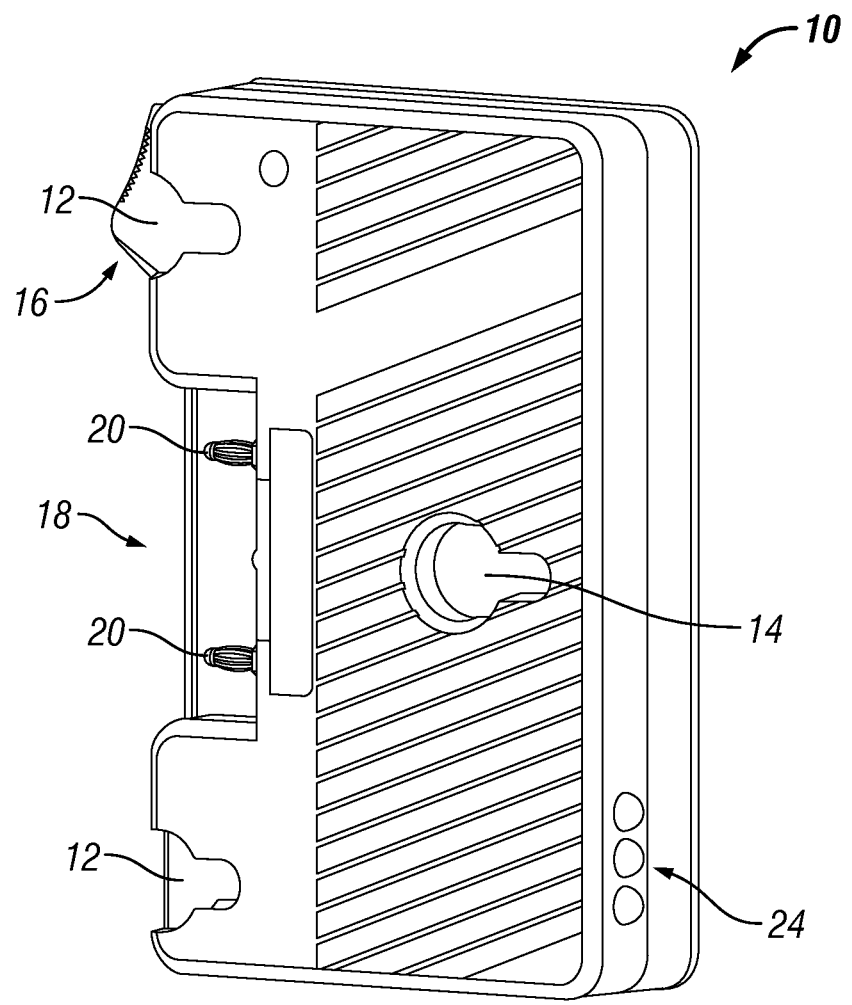
FIG. 1 is a perspective view of a single station universal charge module in accordance with one embodiment of the present invention.
Figure 3:
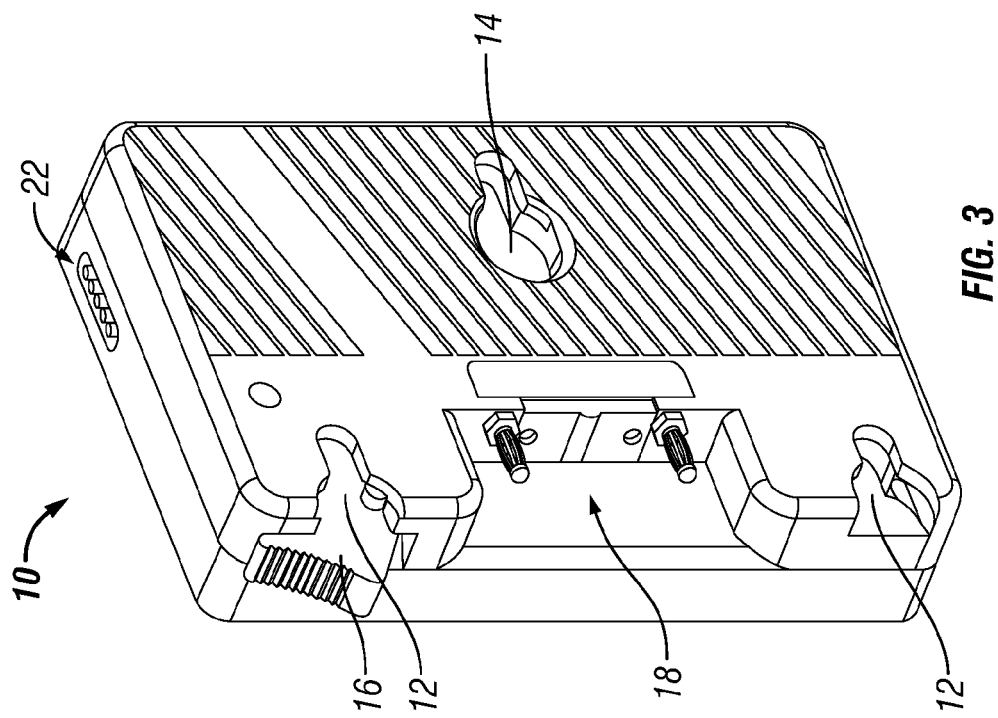
FIG. 3 is a perspective view of the universal charge module of FIG. 1 showing the connector block in accordance with one embodiment of the present invention.
Figure 2:
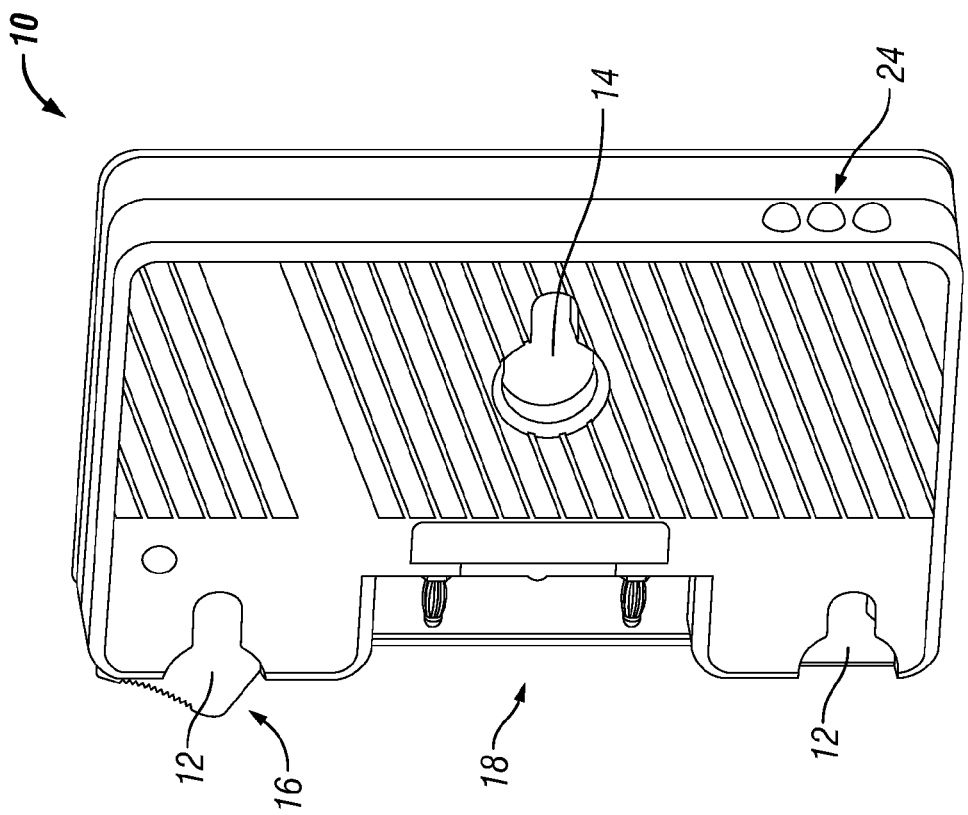
FIG. 2 is a perspective view of the universal charge module of FIG. 1 showing the local charge state LEDs in accordance with one embodiment of the present invention.
Figure 4:
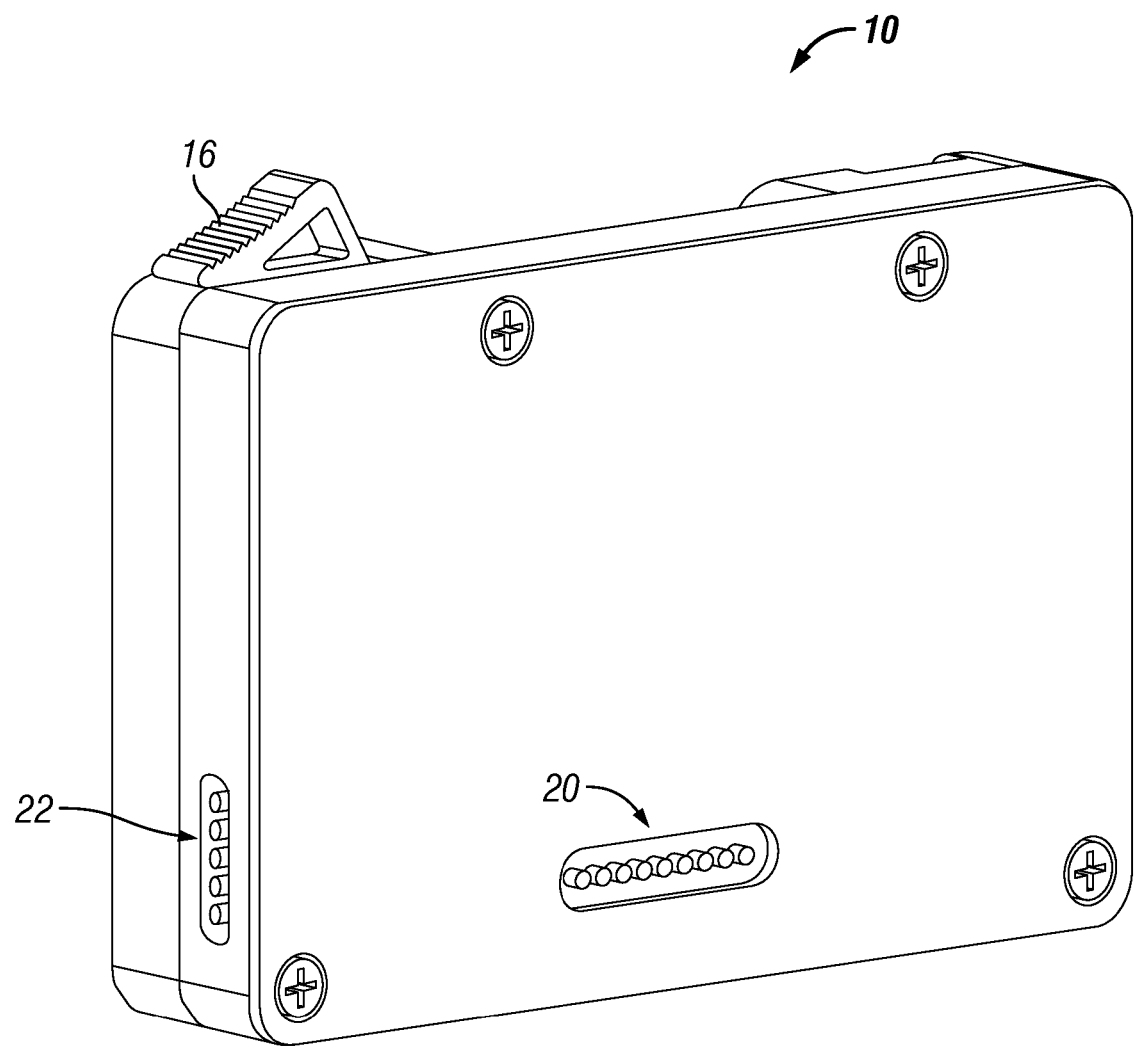
FIG. 4 is an a perspective view of the universal charge module of FIG. 1 showing the programming connector and interface connector in accordance with another embodiment of the present invention.

As shown in FIGS. 1-3, the basic charge module 10 of the present invention generally comprises an Anton/Bauer Gold Mount® housing configuration. The Gold Mount® housing is substantially rectangular in shape and is formed with a plurality of keyholes cut in a front surface thereof, each keyhole having an elongated ovoid or elliptical opening and a narrow depending slot. The keyholes include two upper slots 12 and a centrally located lower slot 14 disposed in a substantially triangular array for releasably attaching a battery, as described below. A positive, thumb-actuated pivoted locking mechanism 16 is also provided to selectively attach and release batteries (not shown) to the charge module.

Formed between the two upper keyholes is a connector block 18. The connector block includes an open top recess in which two male contact terminals 20 are secured. The terminals are in the nature of banana plugs having expandable tips and a threaded shank. As best shown in FIG. 1, they are positioned at the bottom of the recess and connect to electrical contacts within the housing. The connector block and its operation are described in detail in U.S. Pat. Nos. 6,247,962 and 4,822,296, which are hereby incorporated by reference. The banana plug terminals provide a positive (+) and negative (−) circuit connection to a source of power through the charge module 10 to recharge batteries selectively attached to the charge module 10.

In operation, a battery (not shown) may be selectively attached to the charge module 10 by lining up posts or protrusions on the battery with the keyholes 12, 14 of the charge module and sliding the battery so that the posts are received and secured in the depending slots of the keyholes. Such a locking mechanism prevents the battery from being jarred loose and breaking the connection, both physical and electrical, with the charge module 10.

In the preferred embodiment, the universal charge module 10 is a self-contained charging device that features an on-board, 1-5 Amp, buck/boost, DC/DC converter with voltage and current control. The charge module 10 is configured with internal power control circuitry and software that is capable of automatically identifying the type of battery and chemistry of the battery attached to the charge module. Indeed, the battery, when in releasable engagement with the charge module 10, relays its operating parameters to the charge module through the connections therebetween. The internal software, subsequent to detecting the exact battery chemistry, type, operating load, etc., retrieves the appropriate charge profile for a battery having those parameters. The battery is then addressed with the charge routine specifically designed for that battery to reliably and safely charge the battery and optimize battery performance and service life. In this manner, the charge module 10 is capable of automatically detecting any type of battery attached thereto and specifically selecting the appropriate charge routine for that battery and applying such charge routine to the battery. An exemplary control circuit for accomplishing these features is discussed in detail below.

The charge module also features a 9-pin module interface connector 20 on the back side thereof for interfacing with a camera, charging station as described below, or other electronic device. This allows the module to detect the presence of a camera or other electronic device and switching from AC power mode to battery backup mode for UPS power. The charge module further has an interface for connecting to any standard 75, 150 or 300-Watt, 15Vdc AC operated power supply 26 from which power is drawn to charge the battery attached to the module. This interface also allows the module to be connected to any standard 12V automotive based cigarette lighter type voltage source as a dedicated DC operated charger, a solar panel for remote charging, or any other available source. In any case, the internal circuitry and software will detect the nature of the incoming electrical stream and will tailor the outgoing signal to the specific charge profile of the battery.

In connection with the 9-pin module interface connector 20, the universal charge module 10 also features module to module communications for identifying power supply sizes as well as the number of modules attached to a charge system, as described in detail below, so that the charge current per charge station can be automatically calculated. Simultaneous versus sequential charge decisions can also be transmitted from module to module.

Moreover, the universal charge module 10 includes an on-board 5-pin USB programming connector 22, which allows the software installed on the charge module to be updated remotely. As will be readily appreciated, new battery systems that utilize multiple chemistries, charge regimes and cutoff methodologies are continually upgraded and designed by various manufacturers. These new battery systems often trigger software changes to existing products. With the 5-pin USB connector/interface 22, end users may connect the charge module 10 to a computer and access the Internet to download the latest version of software or software updates directly to the charge module 10 so that the charge module is capable of safely and reliably charging any existing or future rechargeable battery.

Figure 5:
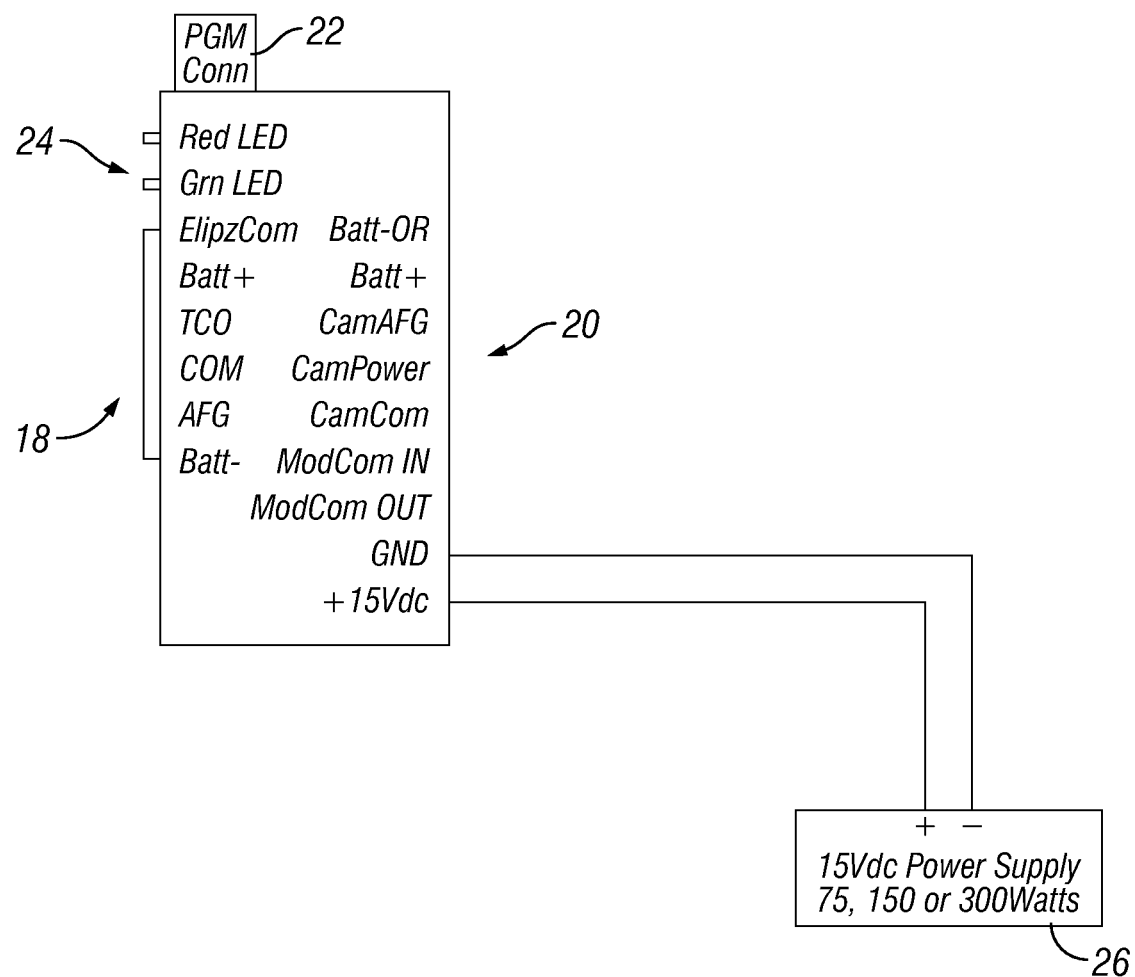
FIG. 5 is a simplified schematic view of the single station universal charge module of FIG. 1 connected to a power supply, in accordance with one embodiment of the present invention.

In the preferred embodiment, the universal charge module also features an on-board LED display 24 for local charge status indication. Both red and green LED indicators may be used to indicate charge status, such as charging, fully charged, or not charging. The charge module also includes an on-board red and green LED connector for remote LED circuit board interface, as described below. Additionally, the charge module may include a Batt-OR circuit for providing power down backup of battery and charger information in certain charger configurations, as discussed below. The charge module may also feature a battery (+) output for providing a means to add a 2 Amp Smart Discharge Interface. A schematic diagram of the universal charge module 10 attached to a power supply 26 is shown in FIG. 5.

The charge module 10 of the present invention may be physically incorporated into cameras so that the charge module is in electrical communication with the camera circuitry. To this end, the charge module also includes a standard camera communications and Anton/Bauer AFG interface for transmitting fuel gauge information to a camera to which it is attached, as best shown in FIG. 5. Moreover, the charge module 10 also features a camera power output for detecting the presence of a camera and switching from AC power mode to battery backup mode for UPS, or uninterruptible power supply, as discussed below.

Figure 6:
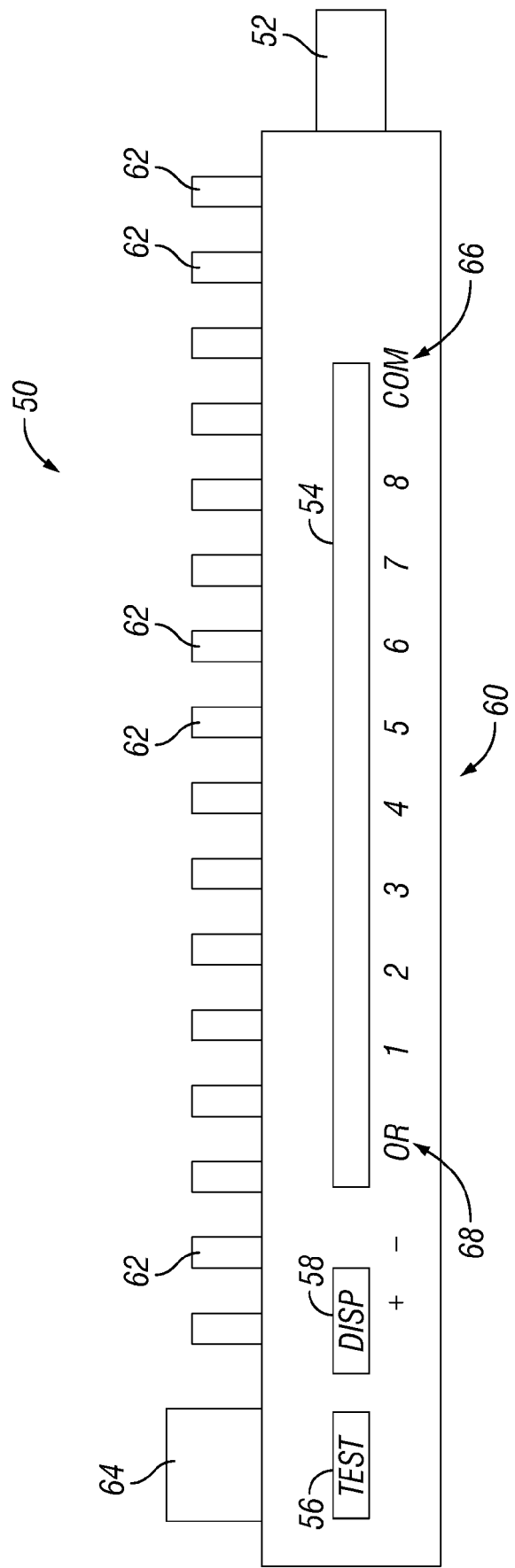
FIG. 6 is a simplified schematic view of a smart LCD board in accordance with one embodiment of the present invention.

In yet another embodiment, as shown in FIG. 6, a smart LCD board 50 may be placed in electrical communication with either a stand-alone charge module 10 or may be interfaced with a base platform as part of a multi-position, multi-battery charger, as discussed in detail below. The smart LCD 50 interfaces with one or more charge modules 10 to display charge and discharge status information, as well as remote LED indications. A USB/printer port 52 may also be connected to the smart LCD board 50 for supplying detailed discharge test information, controlling charge and discharge remotely, and obtaining detailed battery data. As with the charge module, the smart LCD board 50, through the USB interface 52, may obtain charge/discharge control and data over any standard IP connection. Preferably, the smart LCD board 50 has a 2 line, 24 character, blue background, white foreground, backlit display 54 or full color graphics display. The smart LCD board 50 may also have test and display buttons 56, 58 for scrolling text, selecting discharge tests, and toggling between different batteries if the batteries are connected to the smart LCD 50 as part of a multi-position system. The smart LCD 50 further has an 8-channel communications interface 60 for communicating with up to 8 charge modules, creating an up to 8-station charger.

In addition, the smart LCD board 50 may have remote LEDs 62 for indicating charge status in lieu of the local charge module based LEDs 24 described above. Alternatively, or in addition to the smart LCD board based LEDs 62, the smart LCD board is capable of firing the local charge module based LEDs 24 remotely. Moreover, as with the charge module 10 itself, the smart LCD board 50 may include a mini, 5-pin programming connector 64 for simple software updates. The smart LCD board may also include a Smart Discharger communications port 66 for controlling and extracting discharge information from a smart discharge module. Additionally, the smart LCD board 50 may also include a Batt-OR input 68 for providing power down charge status information.

It will be readily appreciated that features may be optionally left off of the smart LCD board 50 to accommodate many different charger configurations. For example, the remote LEDs 62 may be included, but the LCD, discharger, pushbuttons, power down and USB printer capability left off. In essence, the charge module 10 and smart LCD board 50 of the present invention allows an end user to basically build a custom charging system with as few or as many charging stations and peripheral LCD board features as he or she desires.

As alluded to above, in another embodiment, the charge module 10 may be interfaced with a standard Anton/Bauer or general base platform and power supply via the 9-pin connector 20. Importantly, numerous charge modules may be interfaced with a base platform and power supply 26 to form an up to eight-position battery charger. This modularity allows an end user to build a battery charging system to accommodate however many batteries, of the same or different chemistry, as desired.

In connection with the above, FIGS. 5 and 7-12 show examples of various charge module and charging system configurations for single and multi-position chargers that are possible with the charge module 10 and smart LCD board 50 of the present invention. It will be readily appreciated that numerous other configurations may be possible as well. While it is preferred that a 15Vdc, 75, 150 or 300-Watt power supply 26 be used in connection with the present invention, it should be appreciated that other power supply sizes of greater than 300-Watts and less than 75-Watts can be utilized. It will also be appreciated that numerous charger/battery combinations can be designed utilizing the charge module architecture with different style battery configurations.

Figure 7:
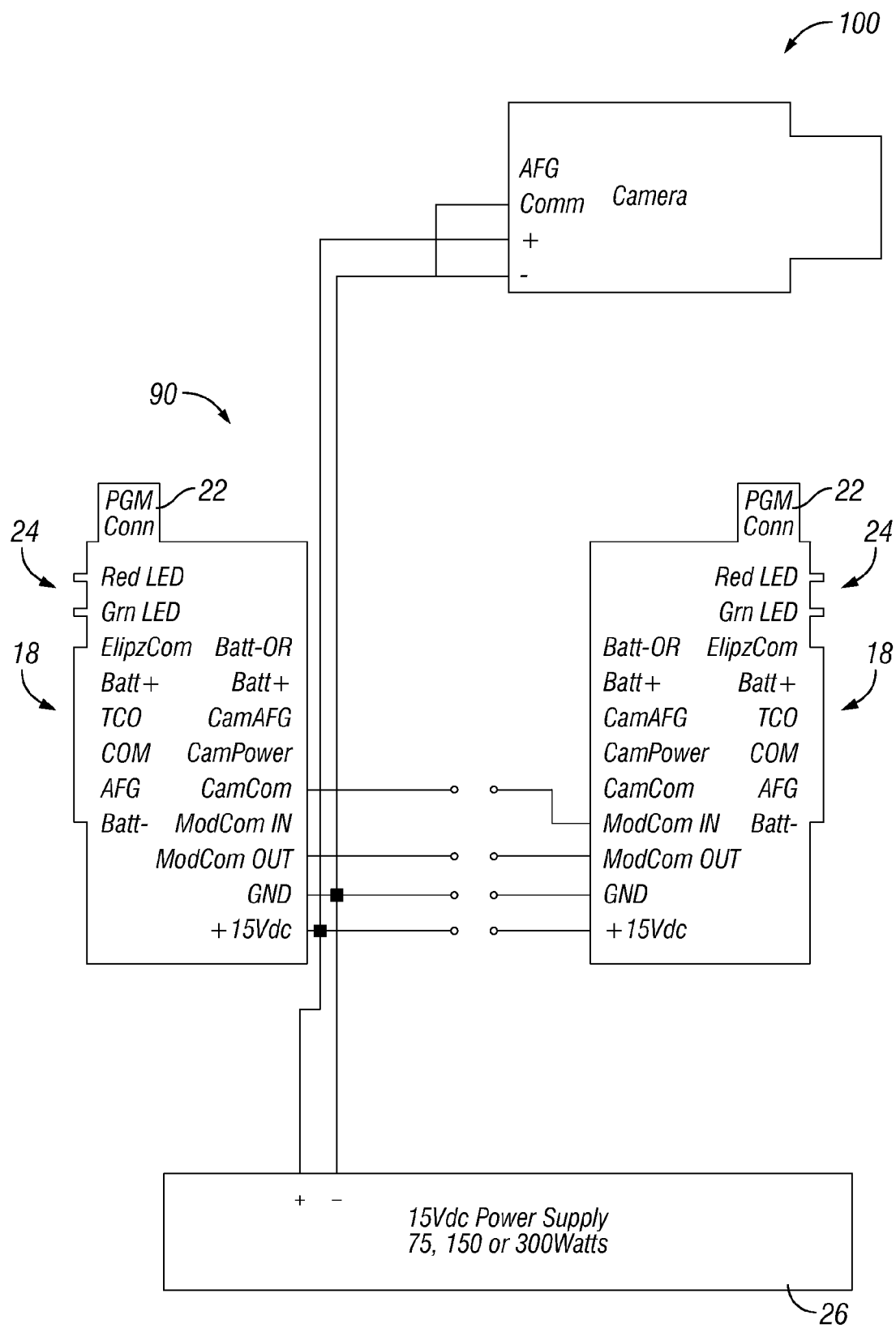
FIG. 7 is a simplified schematic view of a two-position universal charging system in communication with a camera, in accordance with one embodiment of the present invention.

For example, as discussed above, FIG. 5 shows the basic single station charge module 10 of the present invention connected to a power supply 26. FIG. 7 shows a 2-position charging system 90 having one of the charge modules 10 in electrical communication with a video camera 100. In this embodiment, the charging system is capable of operating as a DC power supply once a camera 100 or other device is connected and turned on. This unique system functions by separating the Gold Mount® device from the power supply, allowing a user to simultaneously charge a battery and power a camera. When a 75 watt draw is exceeded, the system automatically stops charging and performs solely as a 150 watt power supply. When the camera is turned off or the load is reduced below 75 watts, the system 90 instantly resumes normal operation, as a simultaneous charger/power supply.

Figure 8:
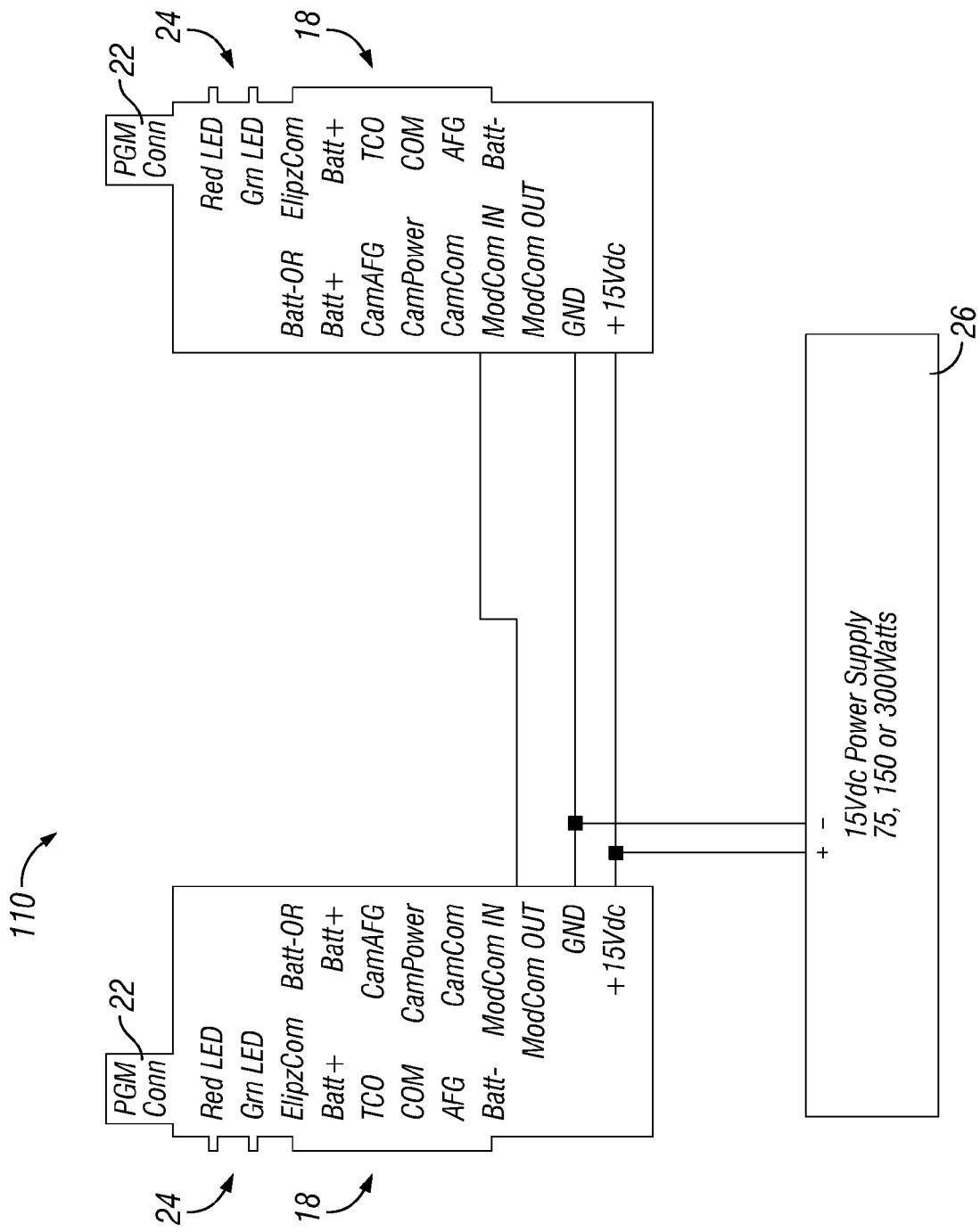
FIG. 8 is a simplified schematic view of a two-position universal charging system in communication with a power supply, in accordance with one embodiment of the present invention.

FIG. 8 shows a 2-position charging system 70 hooked up to a power supply 26. In this embodiment, the charging system 70 is capable of charging two batteries simultaneously, even if the batteries have different chemistries, as discussed above.

Figure 9:
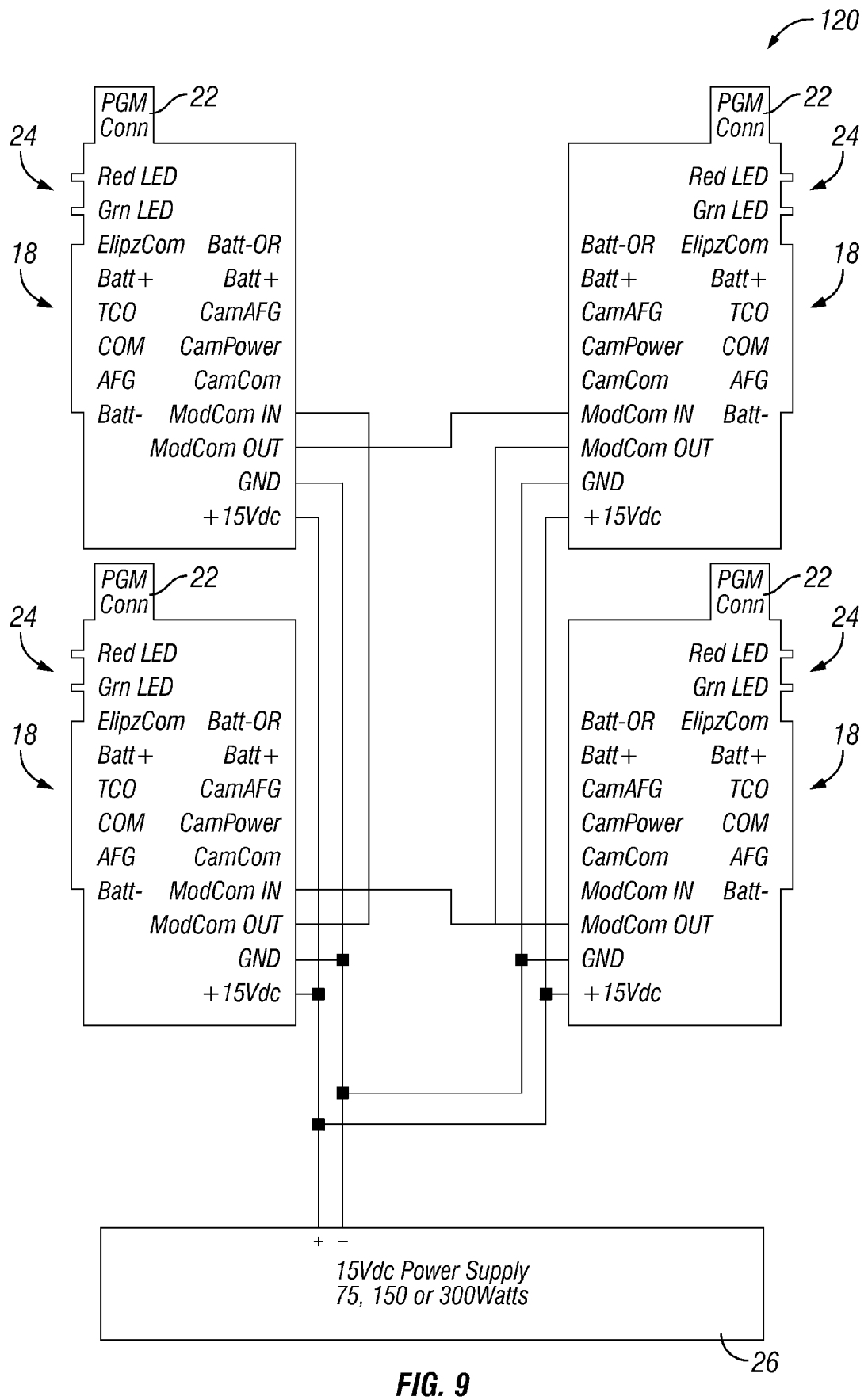
FIG. 9 is a simplified schematic view of a four-position universal charging system, in accordance with one embodiment of the present invention.

An additional embodiment of the present invention is shown schematically in FIG. 9. In this embodiment, a 4-position charging system 120 is disclosed. The charging system 120 is connected to a single power supply and is capable of simultaneously charging four batteries having the same or different chemistries, as discussed above. The system 120 disclosed in this embodiment is advantageous in that it allows a user to continuously cycle batteries over an extended period of time, such as all day shooting.

Figure 10:
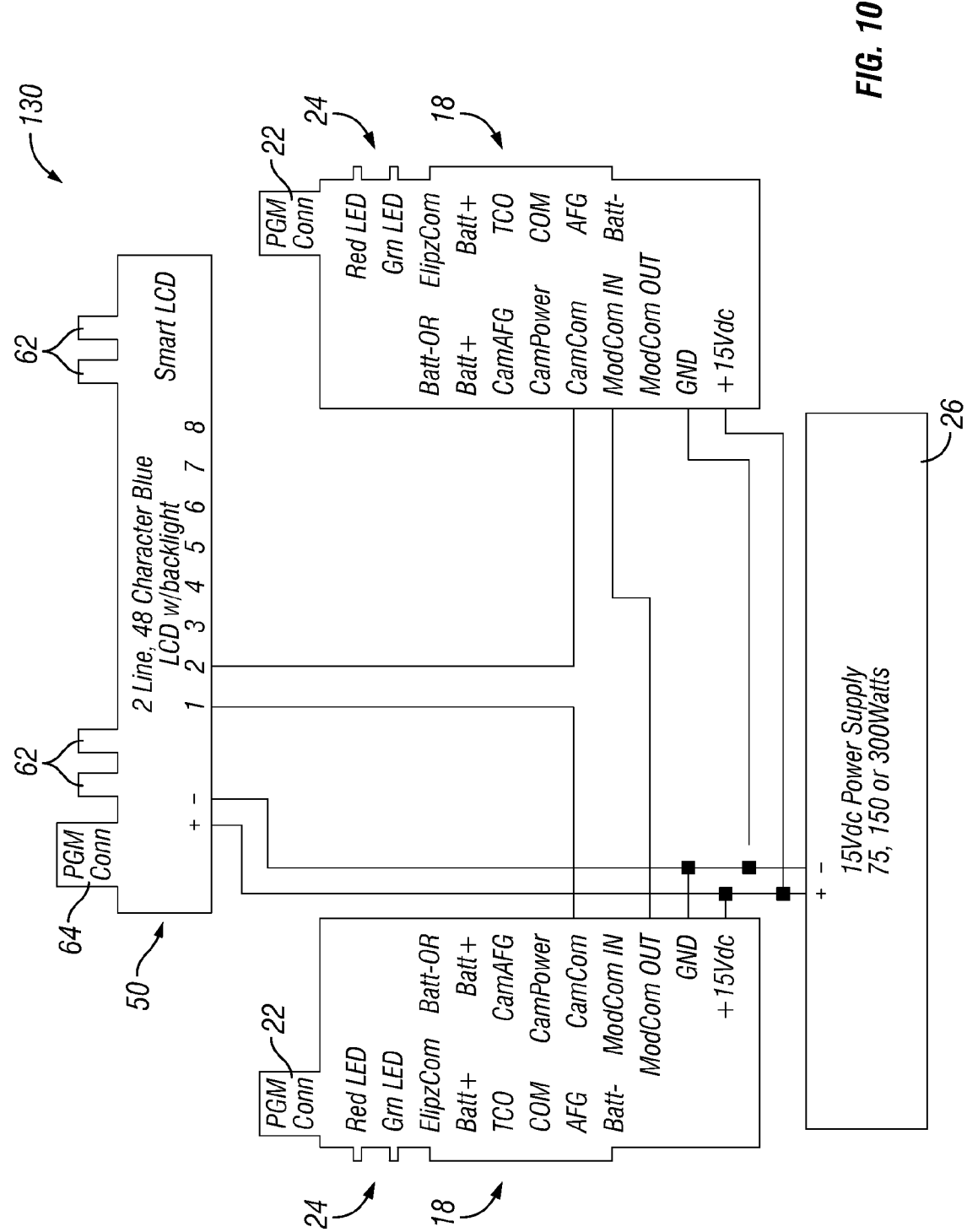
FIG. 10 is a simplified schematic view of a two-position universal charging system featuring the smart LCD board of FIG. 6, in accordance with one embodiment of the present invention.

FIG. 10 shows yet another embodiment of the present invention. As shown therein, this charging system 130 features a dual position charger and smart LCD board 50 connected to a power supply 26.

Figure 11:
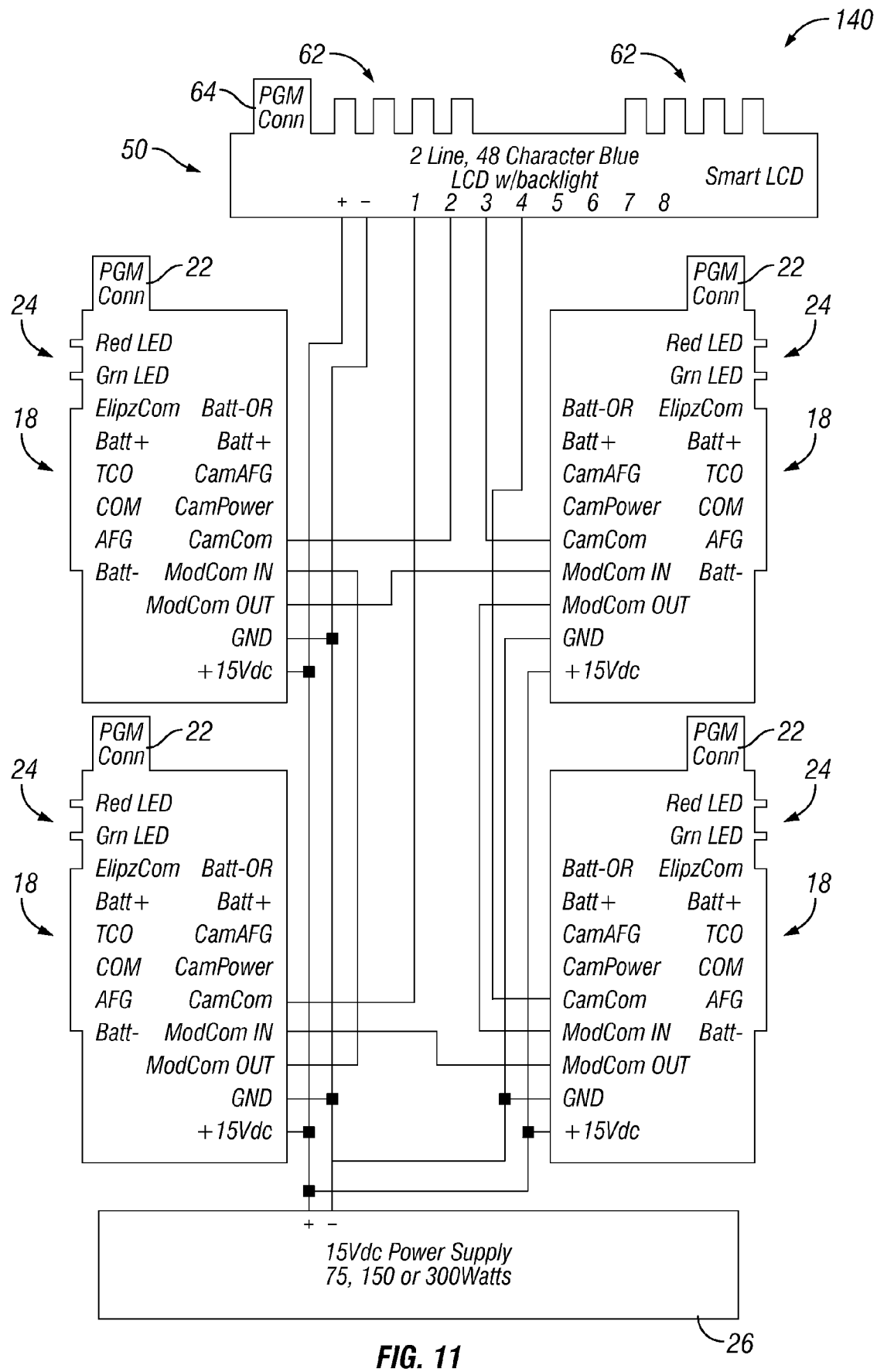
FIG. 11 is a simplified schematic view of a four-position universal charging system featuring the smart LCD board of FIG. 6, in accordance with one embodiment of the present invention.

Turning now to FIG. 11, FIG. 11 shows a four position charging system 140 having a smart LCD board 50 and a power supply 26, according to yet another embodiment of the present invention.

Figure 12:
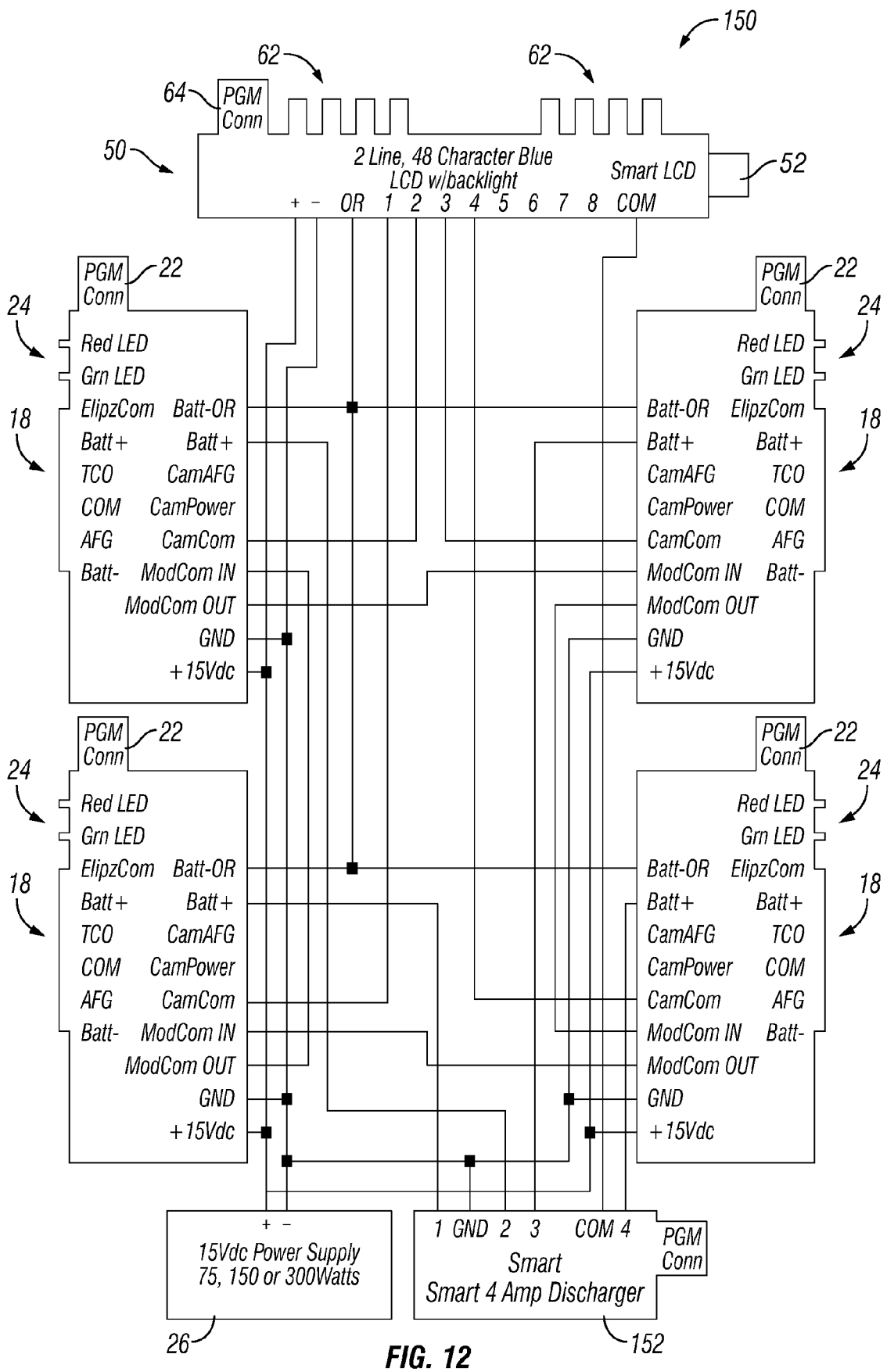
FIG. 12 is a simplified schematic view of a four-position universal charging system featuring the smart LCD board of FIG. 6 and a smart discharger, in accordance with one embodiment of the present invention.
Figure 13:
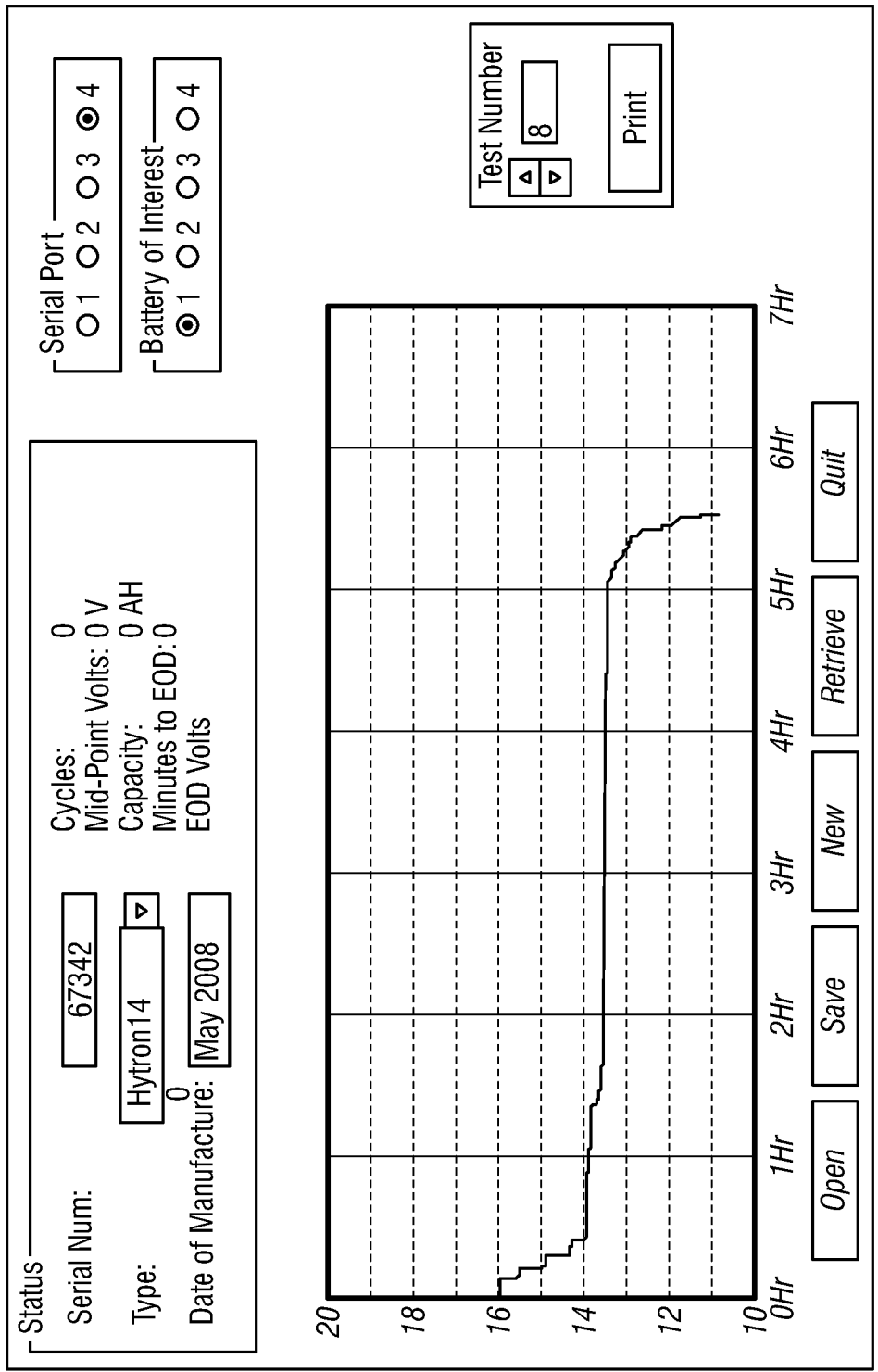
FIG. 13 is a screenshot of a sample battery control/data graphical user interface in accordance with one embodiment of the present invention.

Similar to FIG. 11, FIG. 12 shows a four position charging system 150 having a smart LCD board 50 and a power supply 26. In addition, charging system 150 has a smart discharger 152 in communication therewith, as described above.

Turning now to FIGS. 14-17, a number of matrices showing various off-the-shelf power supply sizes coupled with various charge module configurations and the resultant available charge current and charge times per station are shown. In addition, FIGS. 18-20 show an exemplary remote charger control protocol in accordance with one embodiment of the present invention, as alluded to above.

Figure 21:
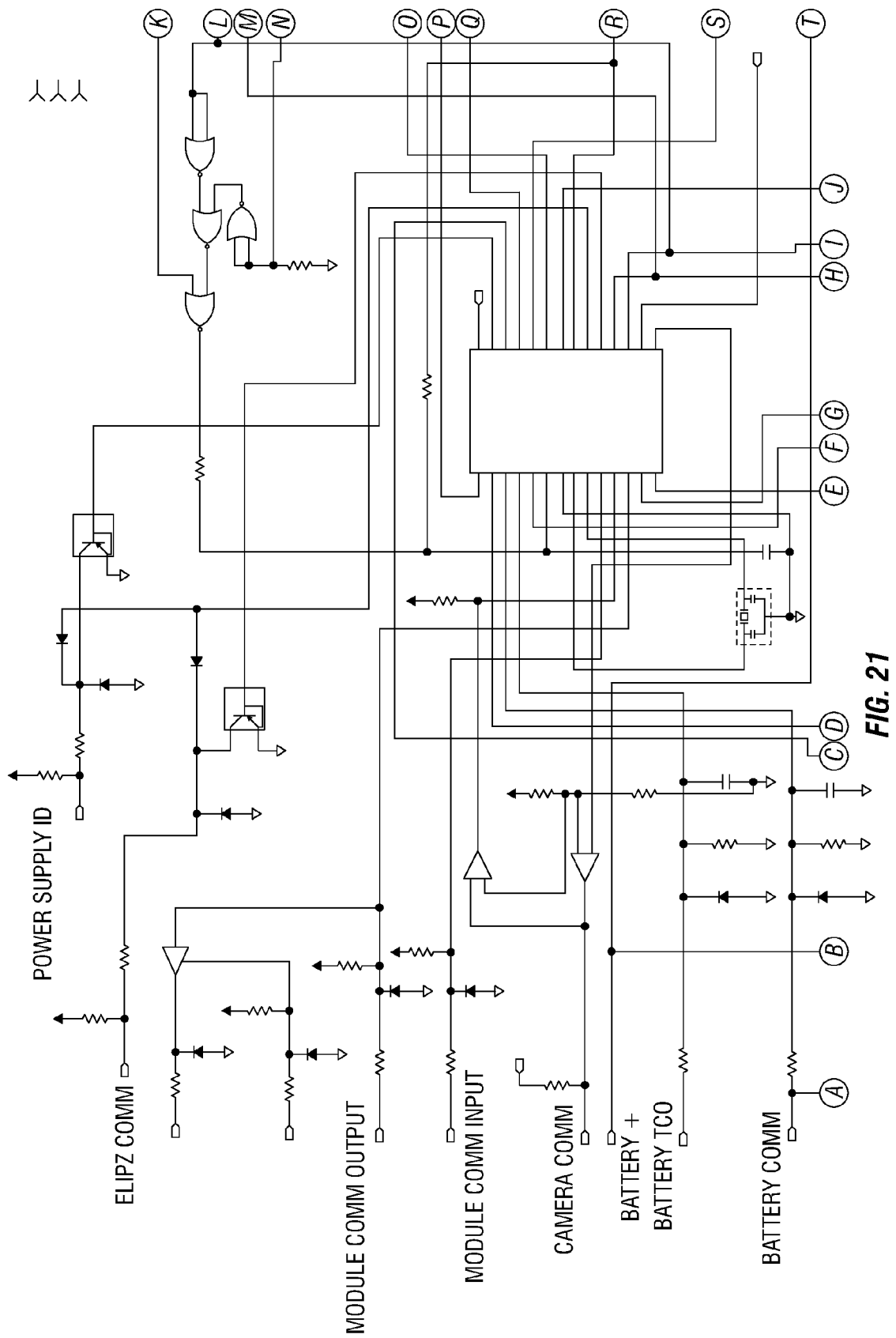
FIGS. 21-23 schematically illustrate an exemplary control circuit in accordance with one embodiment of the present invention.
Figure 21:
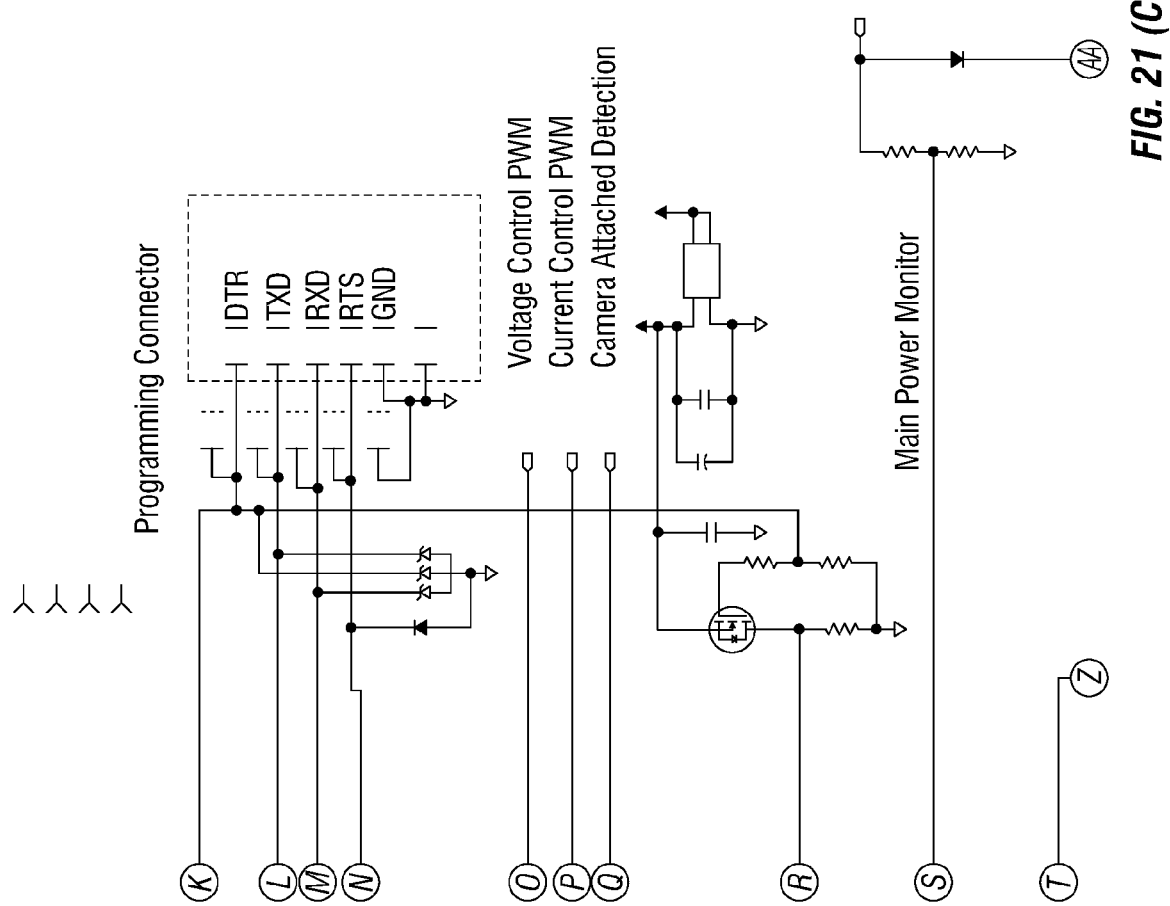
Figure 21:
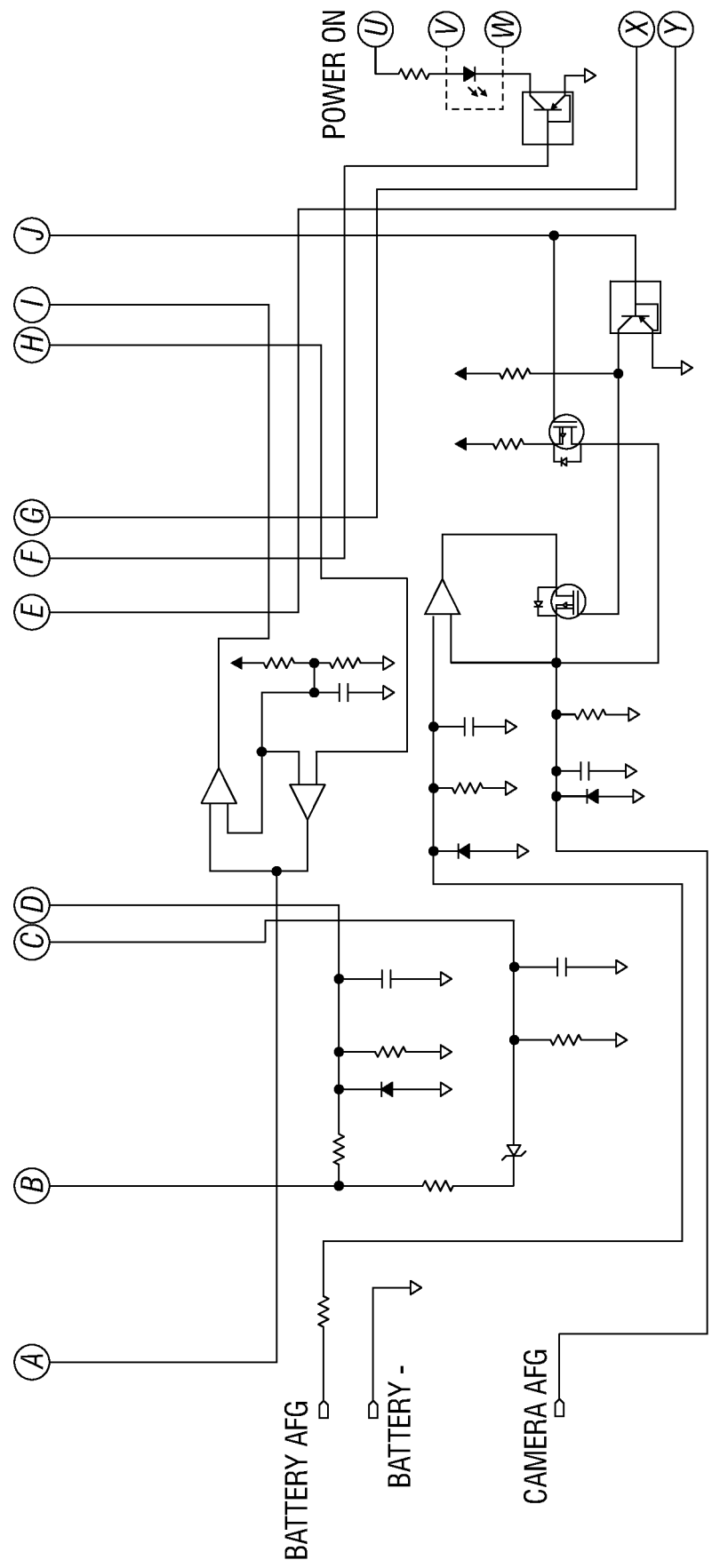
Figure 21:
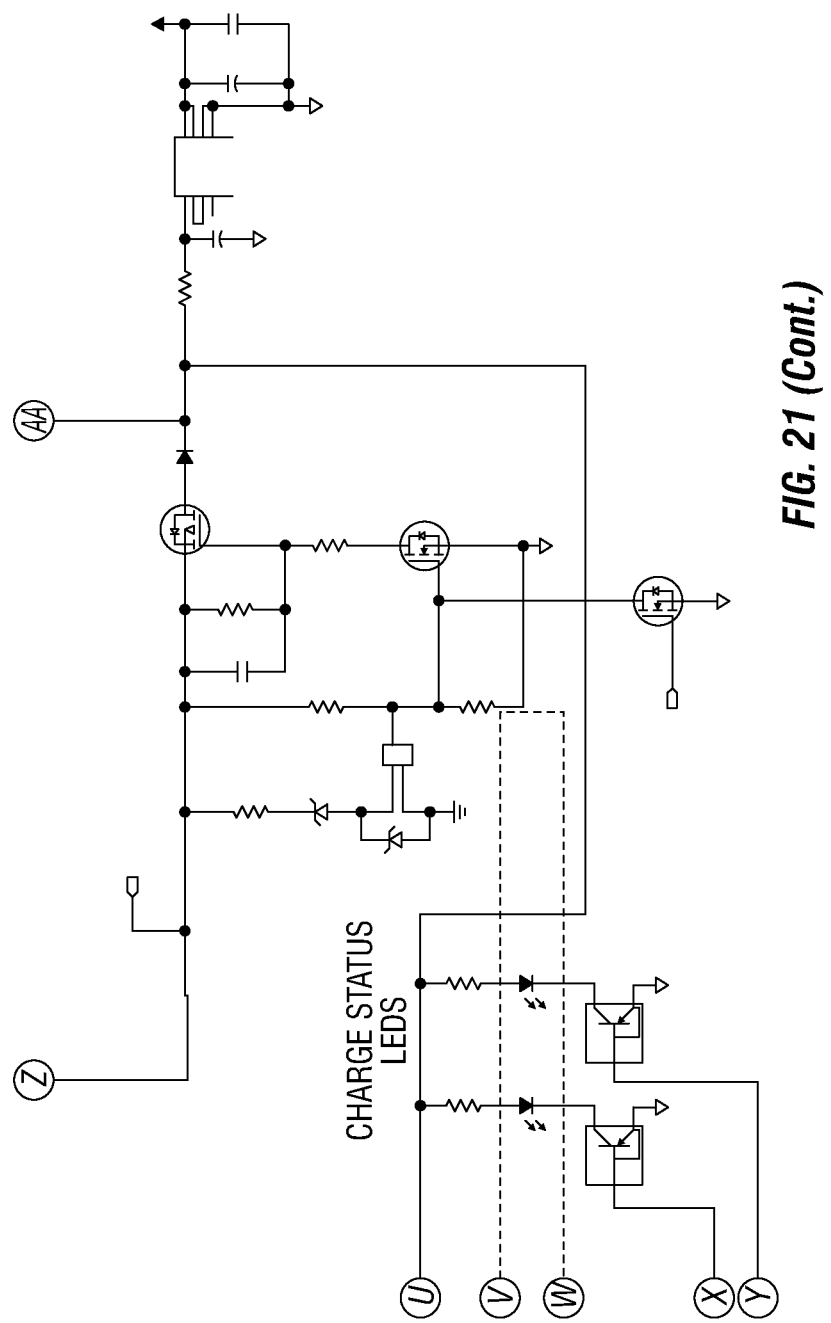
Figure 22:
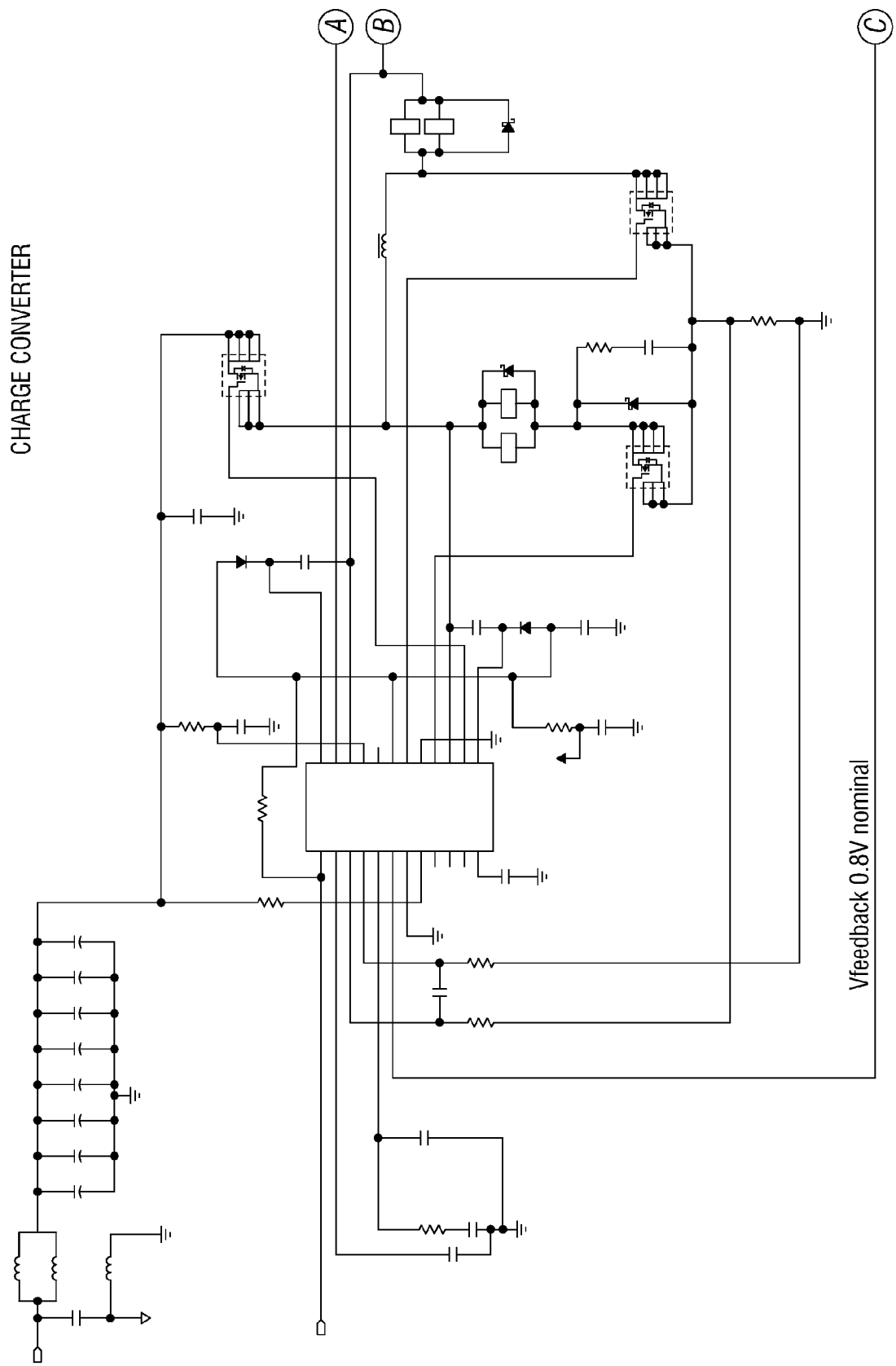
Figure 22:
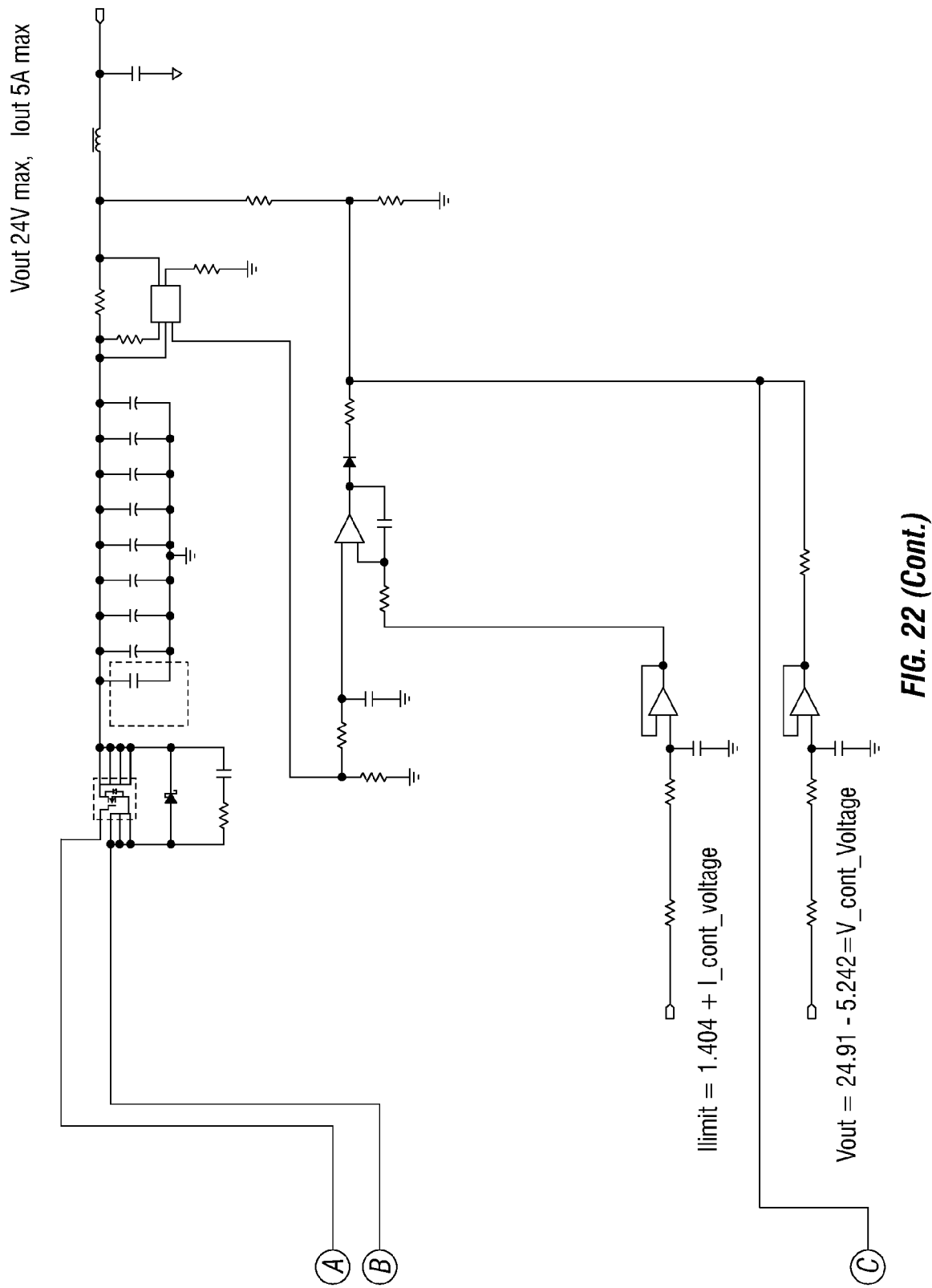
Figure 23:
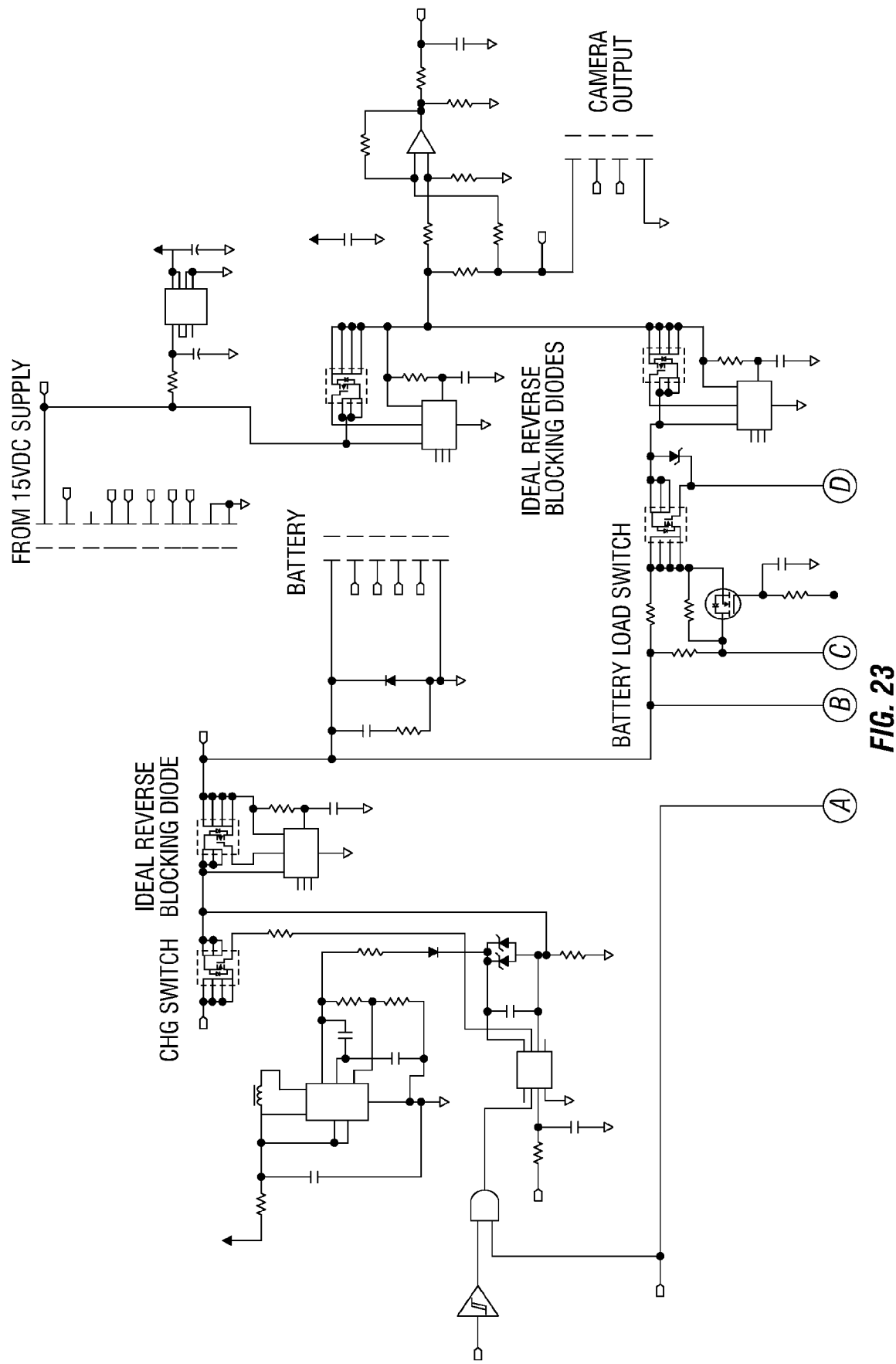
Figure 23:
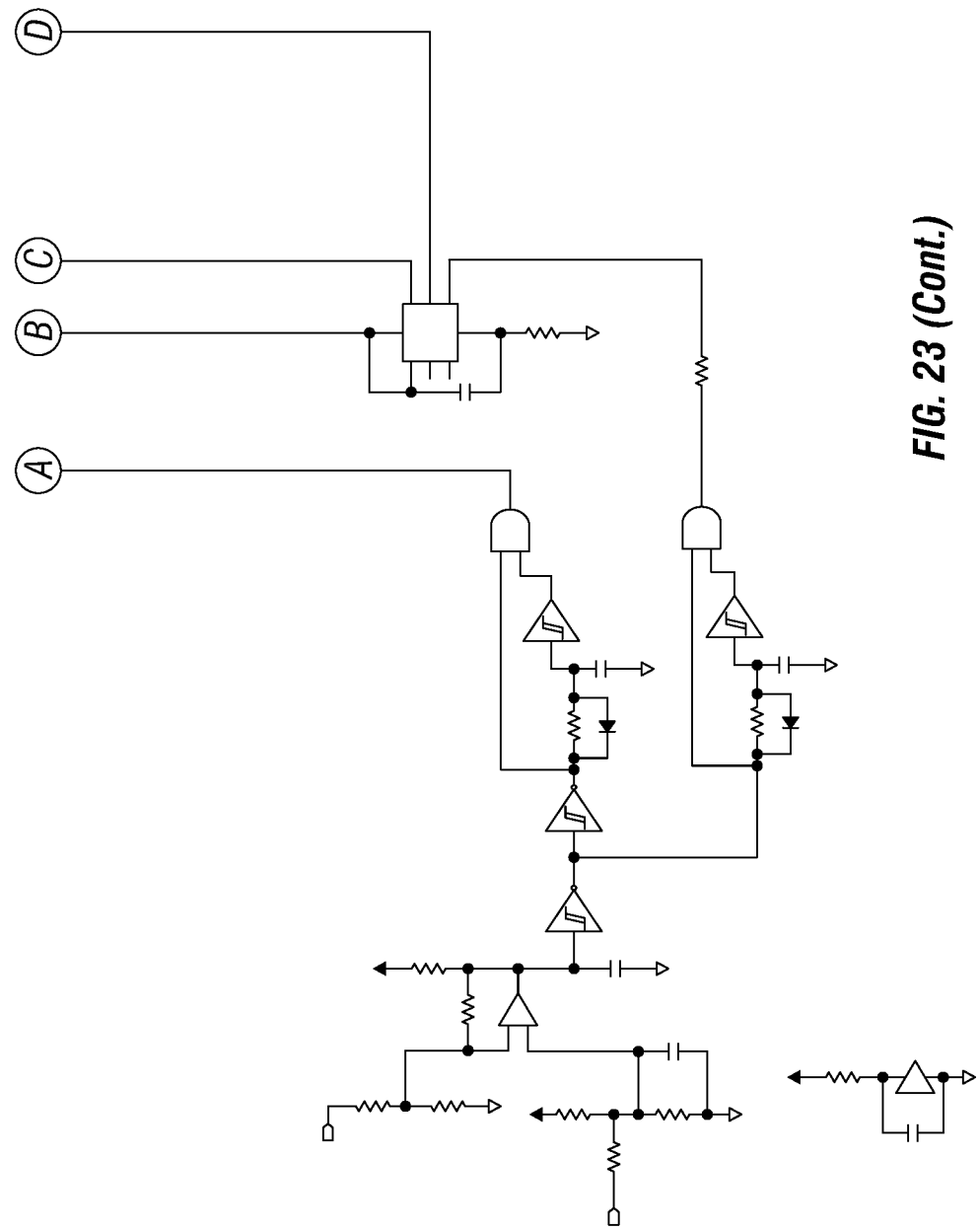

FIGS. 21-23 illustrates one embodiment of the charge module control circuitry. In particular, FIGS. 21-23 illustrate exemplary charge module control circuitry for a four-position charging station, such as that shown schematically in FIG. 9, as discussed above. As will be readily appreciated by those of ordinary skill in the art, alterations in the configuration of the circuitry shown in FIGS. 21-23 are certainly possible without departing from the broader aspects of the present invention.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A universal charging system for charging rechargeable batteries, comprising:
   a plurality of charge stations, each of said charge stations being in electrical communication with one another;
   a connector block formed on each of said charge stations for receiving a rechargeable battery;
   a power control circuit, said power control circuit being capable of determining operating and charging parameters of each of said rechargeable batteries;
   wherein said power control circuit controls the recharging of each of said rechargeable batteries in dependence upon said determined operating and charging parameters;
   a power supply in electrical communication with said universal charging system for supplying power to each of said charge stations; and
   control circuitry for controlling the distribution of electrical power to each of said plurality of charge stations;
   wherein said universal charging system determines the operating parameters of each of said rechargeable batteries and operates to selectively distribute power in the form of a specifically tailored charge routine to each of said rechargeable batteries in dependence on each of said determined operating parameters.

2. The universal charging system of claim 1, further comprising:
   a means for controlling a voltage and a current distributed to said rechargeable battery in dependence upon said determined operating parameters.

3. The universal charging system of claim 2, wherein:
   one of said operating parameters is a chemistry of said rechargeable battery.

4. The universal charging system of claim 2, wherein:
   one of said operating parameters is a charge profile, said charge profile including a charge time, charge rate and charge cut-off.

5. The universal charging system of claim 1, further comprising:
   a LCD board having a communications interface for communicating with said plurality of charge stations for selectively displaying charge and discharge status information of said plurality of charge stations.

6. The universal charging system of claim 5, wherein:
   said LCD board includes a USB/printer port for supplying discharge test information, controlling charge and discharge remotely and obtaining battery data.

7. The universal charging system of claim 1, wherein:
   said LCD board includes a programming interface for updating software of said universal charging system to allow for the charging of additional battery types.

8. The universal charging system of claim 1, wherein:
   said connector block includes positive and negative contacts for the transmission of electricity, and at least one communication contact for the transmission of data.

9. The universal charging system of claim 1, further comprising:
   a power supply in electrical communication with said universal charging system for supplying power to each of said charge stations.

* * * * *